United States Patent
Kim et al.

(10) Patent No.: US 9,856,420 B2
(45) Date of Patent: Jan. 2, 2018

(54) POLYOLEFIN-BASED FLAME RETARDANT RESIN COMPOSITION AND MOLDED PRODUCT

(71) Applicant: LG CHEM, LTD., Seoul (KR)

(72) Inventors: Hong Jin Kim, Daejeon (KR); Eung Soo Kim, Daejeon (KR); Jong Su Kim, Daejeon (KR); Soo Min Lee, Daejeon (KR); Yoon Young Kim, Daejeon (KR)

(73) Assignee: LG CHEM. LTD., Seoul (KR)

( * ) Notice: Subject to any disclaimer, the term of this patent is extended or adjusted under 35 U.S.C. 154(b) by 115 days.

(21) Appl. No.: 14/440,553

(22) PCT Filed: Dec. 1, 2014

(86) PCT No.: PCT/KR2014/011632
§ 371 (c)(1),
(2) Date: May 4, 2015

(87) PCT Pub. No.: WO2015/088170
PCT Pub. Date: Jun. 18, 2015

(65) Prior Publication Data
US 2016/0304785 A1    Oct. 20, 2016

(30) Foreign Application Priority Data

Dec. 10, 2013  (KR) .......................... 10-2013-0153074
Nov. 7, 2014   (KR) .......................... 10-2014-0154108

(51) Int. Cl.
| | |
|---|---|
| *C09K 21/04* | (2006.01) |
| *C08K 3/32* | (2006.01) |
| *C01B 25/165* | (2006.01) |
| *C08K 5/521* | (2006.01) |
| *C08L 23/12* | (2006.01) |
| *C08K 5/49* | (2006.01) |
| *C09K 21/12* | (2006.01) |

(52) U.S. Cl.
CPC ............ *C09K 21/04* (2013.01); *C01B 25/165* (2013.01); *C08K 3/32* (2013.01); *C08K 5/49* (2013.01); *C08K 5/521* (2013.01); *C08L 23/12* (2013.01); *C09K 21/12* (2013.01); *C08K 2003/321* (2013.01); *C08K 2003/327* (2013.01); *C08K 2201/005* (2013.01)

(58) Field of Classification Search
CPC .......... C09K 21/04; C09K 3/32; C09K 5/521; C09K 2003/321; C09K 2003/327; C08L 23/12; C01B 25/165
See application file for complete search history.

(56) References Cited

U.S. PATENT DOCUMENTS

| | | | |
|---|---|---|---|
| 5,312,853 A * | 5/1994 | Staendeke | C08K 3/32 523/179 |
| 6,124,394 A | 9/2000 | Goto et al. | |
| 2002/0065371 A1* | 5/2002 | Fujii | C08L 23/10 525/240 |
| 2004/0143068 A1* | 7/2004 | Honda | C08F 259/08 525/199 |
| 2007/0261878 A1* | 11/2007 | Kosaka | C08L 23/04 174/110 SR |
| 2011/0218279 A1* | 9/2011 | Urushihara | C08K 5/0083 524/141 |
| 2012/0121877 A1 | 5/2012 | Levchik et al. | |
| 2012/0205136 A1 | 8/2012 | Moriuchi et al. | |
| 2013/0059956 A1 | 3/2013 | Levchik et al. | |
| 2013/0274390 A1 | 10/2013 | Sakata | |

FOREIGN PATENT DOCUMENTS

| | | |
|---|---|---|
| CN | 102834444 A | 12/2012 |
| EP | 2151473 A1 | 2/2010 |
| KR | 1020080062975 A | 7/2008 |
| KR | 1020100118374 A | 11/2010 |
| KR | 1020120121913 A | 11/2012 |
| KR | 1020130048426 A | 5/2013 |
| WO | 2011106177 A1 | 9/2011 |

* cited by examiner

*Primary Examiner* — Robert Jones, Jr.
(74) *Attorney, Agent, or Firm* — Dentons US LLP

(57) ABSTRACT

Disclosed are a polyolefin-based flame retardant resin composition and a molded product. The present invention relates to a polyolefin-based flame retardant resin composition satisfying flame retardancy (particularly, UL94V V-0, V-1, and V-2 grades, an auto ignition property of 15 seconds or less, and eco-friendly flame retardancy), improved extrusion properties, a melt index, tensile elongation, or appearance quality required in use of extruded tube molds and the like for insulation and wiring in electrical and electronic products, and vehicles using a particular phosphate-based flame retardant, and a molded product manufactured from the composition are disclosed.

6 Claims, 1 Drawing Sheet

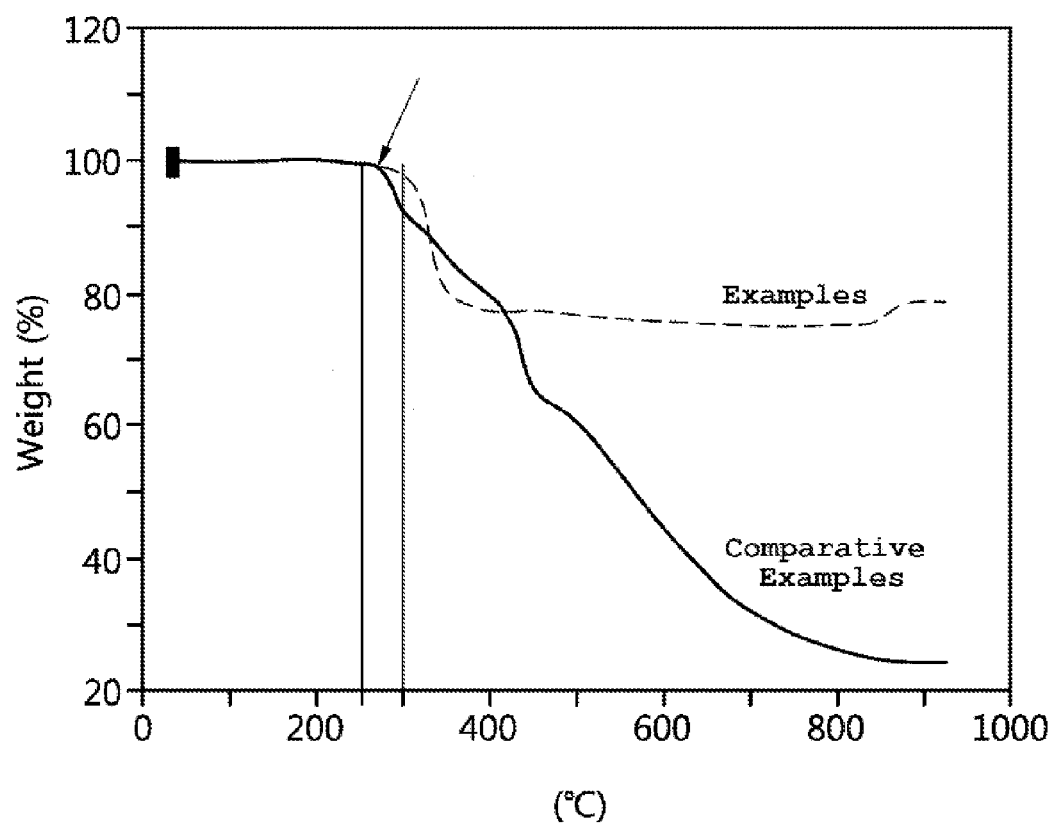

POLYOLEFIN-BASED FLAME RETARDANT RESIN COMPOSITION AND MOLDED PRODUCT

This application is a National Stage Application of International Application No. PCT/KR2017/011632, filed Dec. 1, 2014, and claims the benefit of Korean Patent Application No. 10-2013-0153074, filed Dec. 10, 2013, and Korean Patent Application No. 10-2014-0154108, filed Nov. 7, 2014, all of which are hereby incorporated by reference in their entirety for all purposes as if fully set forth herein.

TECHNICAL FIELD

The present invention relates to a polyolefin-based flame retardant resin composition and a molded product. More particularly, the present invention relates to a polyolefin-based flame retardant resin composition satisfying flame retardancy standards (in particular, UL94V V-0, V-1, and V-2, an auto ignition property of 15 seconds or less and eco-friendly flame retardancy), improved extrusion properties, a melt index, tensile elongation, or appearance required in use of extruded tube molds and the like for insulation and wiring in electrical and electronic products, and vehicles using a particular phosphate-based flame retardant, and a molded product manufactured from the composition.

BACKGROUND ART

As materials applied to a tube system in a vehicle engine room, there are for example polyamide, polyester, and polyethylene resins, and polyolefin resins such as such as polypropylene resins and the like.

Since the materials are exposed to high-temperate environments for a long time, superior flame retardancy and long-term thermal resistance are essentially required. Materials to which a halogen-based flame retardant system including and/or satisfying the both properties is applied are used. However, due to recently intensified environmental regulation, requirements for eco-friendly materials and products are greatly increased and, thus, a research into the materials is actively underway.

As eco-friendly flame retardant systems which may be applied to polyolefin resins, metal hydroxides, phosphate-based materials, and the like may be considered. However, in the case of metal hydroxides, a large amount, namely, 40% or more, of flame retardant must be added and molding properties, water resistance, and mechanical performance may be deteriorated. Accordingly, phosphate based retardants are mainly considered (related prior literature: Korean Application Pub. No. 2013-0048426).

For example, since phosphate based retardants are added in an amount of 20% or more, properties thereof may be realized without use of halogens, heavy metals, and the like. However, due to an excessive addition amount of a flame retardant in the phosphate based retardants when compared with conventional halogen-based materials, it is difficult to effectively disperse the flame retardant and, thus, there are limitations in flame retardancy and extrusion properties. Therefore, there is an urgent need for development of a polyolefin-based flame retardant resin composition which may resolve these problems.

DISCLOSURE

Technical Problem

Therefore, the present invention has been made in view of the above problems, and it is one object of the present invention to provide a molded product having improved flame retardancy, extrusion properties, and superior appearance by expressing Char foaming as a flame retardant mechanism of conventional phosphate-based flame retardants and runaway effects of dripping behavior at a gas phase together while applying a smaller amount of a particular phosphate-based flame retardant than conventional phosphate-based flame retardants, with regard to a polyolefin-based flame retardant resin composition used in extruded tubes and the like for insulation and wiring of electrical and electronic products and vehicles.

It is another object of the present invention to provide an extrusion tubing molded product which is environmentally friendly and improves poor flame retardancy and poor extrusion properties by improving flame retardancy and appearance through application of a liquid-type phosphate ester while avoiding use of a conventionally added phosphate flame retardant in an excessive amount and further optimizing fluidity and melt strength of a polymer suitable for tube extrusion molding through addition of a surface-modified fluorine resin powder, with regard to an eco-friendly flame retardant resin composition used in extruded tubes for insulation and wiring of electrical and electronic products and vehicles.

Technical Solution

In accordance with one aspect of the present invention, provided is a polyolefin-based flame retardant resin composition comprising a polyolefin resin and a phosphate-based flame retardant, the phosphate-based flame retardant comprising 30 wt % of phosphate and the composition comprising 4 to 30 wt % of a solid phase phosphate-based flame retardant having normal particle size distribution (D50) of 7 microns or less based on a total of ingredients constituting the composition.

In accordance with another aspect of the present invention, provided is polyolefin-based flame retardant resin composition comprising a polyolefin resin and a phosphate-based flame retardant, the phosphate-based flame retardant comprising 15 to 40 wt % of a solid phase phosphate flame retardant and 0.1 to 15 wt % of a liquid-type phosphate ester flame retardant based on 100 wt % in total of ingredients constituting the composition.

In accordance with yet another aspect of the present invention, provided is a product molded from the composition.

Advantageous Effects

As apparent from the fore-going, eco-friendly flame retardancy of a polyolefin resin according to the present invention is realized using a phosphate-based flame retardant. As the phosphate-based flame retardant, a particular solid phase flame retardant having satisfactory dispersibility, thermal stability at high temperature as a result of thermal gravity analysis (TGA), and superior long-term thermal resistance is added in a relatively small amount. As results, inefficient dispersion of a flame retardant due to addition of an excess amount of conventional phosphate-based flame retardant, and poor flame retardancy and extrusion properties are compensated. In addition, a molded product having improved flame retardancy, extrusion properties, and appearance may be provided.

In addition, according to the present invention, eco-friendly flame retardancy of the polyolefin resin is realized using a phosphate flame retardant. A loading amount due to application of the phosphate flame retardant becomes excessive and, thus, effective flame retardant dispersion becomes difficult, thereby deteriorating flame retardancy and extrusion properties. To compensate the deteriorated flame retardancy and extrusion properties, liquid-type phosphate ester is applied, thereby improving flame retardancy and appearance quality. Furthermore, by suggesting a polypropylene flame retardant resin composition having optimized polymer fluidity and melt strength through application of a surface-modified fluorine resin powder suitable for tube extrusion molding, a extrusion tubing molded product having improved flame retardancy and extrusion properties may be provided while realizing eco-friendliness.

DESCRIPTION OF DRAWINGS

FIG. 1 is a graph comparing a smooth dynamic TGA peak of a solid phase phosphate-based flame retardant of Example 1 according to the present invention and a rapid dynamic TGA peak of a conventional solid phase phosphate-based flame retardant used in Comparative Example 2.

BEST MODE

Hereinafter, the present invention will be described in more detail.

A polyolefin-based flame retardant resin composition according to one embodiment of the present invention comprises a polyolefin resin and phosphate-based flame retardant, the phosphate-based flame retardant comprising 30 wt % of phosphate and the composition comprising 4 to 30 wt % of a solid phase phosphate-based flame retardant having normal particle size distribution (D50) of 7 microns or less based on a total of ingredients constituting the composition.

As a specific embodiment, the polyolefin resin may be a polypropylene resin.

In addition, the polyolefin-based flame retardant resin composition of the present invention is an eco-friendly flame retardant resin composition which does not contain a halogen or contains little halogen.

The expression "solid phase phosphate-based flame retardant" used in the present invention, so long as not specified otherwise, means a retardant containing a specific phosphate type, the retardant being a solid phase at room temperature and expressing Char foaming as a flame retardant mechanism of a conventional phosphate flame retardant although applied in a smaller amount than a conventional phosphate-based flame retardant is applied thereto, and expressing the gas phase and runaway effect of dripping behavior.

In one embodiment, phosphate content of the solid phase phosphate-based flame retardant may be 30 to 42 wt %, 30 to 35 wt %, 30 to 32 wt %, or 30.5 to 31.5 wt %, as measured after treating with sulfuric acid and nitric acid using ICP-OES spectrometer (OPTIMA 7300DV available from PERKIN-ELMER) and then diluting.

A normal particle size distribution (D50) of the solid phase phosphate-based flame retardant, which is measured using Mastersizer 2000 available from Malvern, may be 7 microns or less.

In another embodiment, the solid phase phosphate-based flame retardant may be a compound represented by formula $[H2PO-O]_n M^{n+}$, wherein n is an integer of 1 to 3 and M is at least one selected from Al, Ca, Na, Zn, Ba, and Mg.

M may be one or more selected from Al, Ca, and Zn, and, when Al is used alone or Al is comprised, flame retardancy is preferably increased.

In another embodiment, smooth thermal decomposition of a dynamic TGA peak (corresponding to dynamic TGA peak-auto ignition temperature) of the solid phase phosphate-based flame retardant occurs at 275 to 300° C. (See Example of FIG. 1) and, thus, a thermal decomposition degree and weight loss are low, when compared with a initial point. In one embodiment, properties thereof were maintained without appearance deformation and cracks up to 135° C.×3000 hr.

For reference, rapid thermal decomposition of a dynamic TGA peak of the phosphate-based flame retardant, in which a phosphate content measured using ICP-OES (OPTIMA 7300DV available from PERKIN-ELMER) after treating sulfuric acid and nitric acid and diluting using ICP-OES was 18 to 20 wt %, as a solid phase phosphate-based flame retardant occurred near 250° C. (See Comparative Example of FIG. 1). Thus, large weight loss, and rapid property deterioration during hygroscopicity, thermal resistance, and long-term reliability tests were exhibited.

The solid phase phosphate-based flame retardant constituting the composition may comprise a processing aid. The processing aid has an auto-ignition temperature of 400° C. or more and is preferably used with a material, which may provide a maximal process temperature of 290° C., when provided with a solid phase phosphate-based flame retardant.

In one embodiment, the processing aid may include a phosphate based compound such as di-2,6-dimethylphenyl phosphate or the like. As a commercially available product, there is PX-200.

The amount of the processing aid may be 0.1 to 20%, or 0.1 to 10% based on the solid phase phosphate-based flame retardant constituting the composition. Within the range, dispersibility is effectively increased.

The amount of the polyolefin resin may be 70 to 96 wt % or 80 to 95 wt % and the amount of the solid phase phosphate-based flame retardant may be 4 to 30 wt %, or 5 to 20 wt %, based on 100 wt % of the total composition. Within the range, an auto-ignition property of 15 seconds or less, extrusion workability, and appearance such as gloss and roughness may be provided while maintaining flame retardancy grade V-2 measured according to UL 94.

In one embodiment, the polypropylene resin of the polyolefin resin has a melt index (MI) of 0.1 to 30 g/10 minutes (ASTM D1238, 230° C.) and may be an isotactic propylene homopolymer, an ethylene-propylene block or random copolymer, or a mixture thereof, which has crystallizability.

As a specific embodiment, the polypropylene resin may be a mixture of at least one of isotactic propylene homopolymers and ethylene-propylene block or random copolymers having a melt index (MI) of 0.1 to 100 g/10 minutes (ASTM D1238, 230° C.) or 0.1 to 8 g/10 minutes (ASTM D1238, 230° C.) and crystallizability; and at least one of an isotactic propylene homopolymer and ethylene-propylene block or random copolymer having a melt index (MI) of greater than 8 to 20 g/10 minutes (ASTM D1238, 230° C.) and crystallizability.

The polyolefin-based flame retardant resin composition, as needed, may further comprise at least one additive selected from a lubricant, an antioxidant, a photostabilizer, a chain extender, a catalyst, a release agent, a pigment, a dye, an antistatic agent, an antimicrobial agent, a processing aid, a metal deactivator, a smoke suppressant, an inorganic filler, glass fiber, an antifriction agent, an antiwear agent, and a coupling agent. In one embodiment, the additive may be used in an amount which does not negatively affect properties of the present invention.

The polyolefin-based flame retardant resin composition according to one embodiment of the present invention comprises a polyolefin resin and a phosphate-based flame retardant, the phosphate-based flame retardant comprising 15 to 40 wt % of a solid phase phosphate flame retardant and 0.1 to 15 wt % of a liquid-type phosphate ester flame retardant based on 100 wt % in total of ingredients constituting the composition.

The expression "solid phase phosphate flame retardant" used in the present invention, so long as not specified otherwise, means a phosphate flame retardant that is a solid at room temperature.

In one embodiment, the solid phase phosphate flame retardant may be at least one selected from triphenyl phosphate, diphenyl cresyl phosphate, ammonium polyphosphate, melamine polyphosphate, melamine pyrophosphate, melamine ammonium phosphate, piperazine pyrophosphate, piperazine phosphate, piperazine polyphosphate, piperazine pyrophosphate-phosphate-zinc oxide, 2-carboxyethyl phenyl phosphinic acid, 9,10-dihydro-9-oxa-10-phosphaphenanthrene-10-oxide, and 10-(2,5-dihydroxyphenyl)-9,10-dihydro-9-oxa-10-phosphaphenanthrene-10-oxide.

As a specific embodiment, the solid phase phosphate flame retardant may be at least one selected from ammonium polyphosphate, melamine polyphosphate, melamine pyrophosphate, piperazine polyphosphate, and triphenyl phosphate.

In another embodiment, the solid phase phosphate flame retardant may comprise an effective N—P-based ingredient as a white powder, other synergists, flame retardant aids, and the like.

The solid phase phosphate flame retardant may be water treated, and pre-treated through coating or the like to increase reaction efficiency.

The expression "liquid-type phosphate ester" used in the present invention, so long as not specified otherwise, means phosphate ester in a liquid state at room-temperature (20° C.) under atmospheric pressure.

The liquid-type phosphate ester may smooth a surface by improving dispersibility of the solid phase phosphate flame retardant and decrease a use amount of the solid phase phosphate flame retardant by increasing dispersion force.

In one embodiment, the liquid-type phosphate ester may be at least one selected from trimethyl phosphate, triethyl phosphate, triphenyl phosphate, tricresyl phosphate, trixylenyl phosphate, resorcinol bis(diphenyl phosphate), phenyl diresorcinol phosphate, bisphenol diphenyl phosphate, cresyl diphenyl phosphate, xylenyl diphenyl phosphate, phenyl di(isopropylphenyl)phosphate, triisophenyl phosphate, resorcinol diphosphate, and aromatic polyphosphate.

As a specific embodiment, the liquid-type phosphate ester may be at least one selected from resorcinol bis(diphenyl phosphate), phenyl diresorcinol phosphate, bisphenol diphenyl phosphate, cresyl diphenyl phosphate, xylenyl diphenyl phosphate, and phenyl di(isopropylphenyl) phosphate.

The resin composition comprises 50 to 80 wt % of a polyolefin resin and 0.1 to 5 wt % of a surface-modified fluorine resin powder based on 100 wt % in total of ingredients constituting the composition.

As a specific embodiment, the polyolefin resin may be a polypropylene resin.

Examples of the polypropylene resin being one example of the polyolefin resin include those described above.

The surface-modified fluorine resin powder may optimize fluidity and melt strength of a polymer suitable for extrusion molding of a tube.

In one embodiment, the surface-modified fluorine resin powder may be prepared by extruding 0.1 to 90 wt % of a surface-modified polytetrafluoroethylene having a weight-average molecular weight of 100,000 g/mol or more and an average particle diameter of 10 μm or less; and 10 to 99.9 wt % of a high molecular weight polypropylene resin having viscosity of 500 to 1400 ml/g.

In one embodiment, the surface modification may be acrylic modification in which the polytetrafluoroethylene is modified with alkyl (meth)acrylate and the alkyl (meth)acrylate used in the surface modification may comprise 10 to 90 wt % or 50 to 90 wt % of alkyl methacrylate having a C1 to C30 alkyl group and 90 to 10 wt % or 50 to 10 wt % of alkyl acrylate having a C1 to C30 alkyl group.

In another embodiment, the surface-modified fluorine resin powder may have a weight-average molecular weight of 1,000,000 g/mol or more, 5,000,000 g/mol or more, or 1,000,000 g/mol to 10,000,000 g/mol and may be prepared by extruding 40 to 70 wt % surface-modified polytetrafluoroethylene having an average particle diameter of 0.05 to 1 μm and 30 to 60 wt % of a high molecular weight polypropylene resin having a viscosity of 500 to 1400 ml/g.

As a specific embodiment, the polyolefin-based flame retardant resin composition may comprise 50 to 80 wt % or 51 to 77.9 wt % of a polypropylene resin as one example of the polyolefin resin, 15 to 40 wt % or 20 to 30 wt % of a solid phase phosphate flame retardant, 0.1 to 15 wt % or 2 to 15 wt % of a liquid-type phosphate ester, and 0.1 to 5 wt %, or 0.1 to 4 wt % of a surface-modified fluorine resin powder.

In addition, the resin composition may comprise the additives described above, as needed.

The polyolefin-based flame retardant resin composition of the present invention is melt kneaded at 200 to 300° C. using one of a variety of mixing and processing devices such as a twin-screw extruder, a single-screw extruder, a roll mill, a kneader, a banbury mixer, and the like after primarily mixed in a mixer or a super mixer selectively using the additive. Subsequently, a pellet is obtained through extrusion. An extrusion tubing product from the pellet may be obtained or an injection molded product may be manufactured by injection processing after sufficiently drying the pellet using a dehumidifying dryer or a hot-air dryer.

In one embodiment, in the presence of a non-anti dripping agent, an extrusion tubing molded product satisfying flame retardancy such as UL94V V-2 and an auto ignition property of 15 seconds or less required to use in an extrusion tubing molded product for insulation and wiring of electrical and electronic products and vehicles, and improved extrusion properties and appearance may be provided. In addition, as another embodiment, an injection molded product may be provided. The expression "non-anti dripping agent" means those except an anti dripping agent, so long as not specified otherwise.

In another embodiment, an extrusion tubing molded product molded with the polypropylene flame retardant resin composition and satisfying flame retardancy such as UL94V V-0 or V-1 and an auto ignition property of 15 seconds or less required in use of an extrusion tubing molded product for insulation and wiring of electrical and electronic products and vehicles, and improved extrusion properties, melt index, and tensile elongation may be provided. In addition, as another embodiment, an injection molded product may be manufactured.

In one embodiment, the molded product may be a blow or vacuum molded product. As a specific embodiment, the molded product may be used in fluid transfer tubes for industry, medicine transfer tubes, tubes for fuel gas supply, tubes for vehicle fuel, protectors for a vehicle cable, electric cables, cable sheaths, cable ties, and the like.

Now, the present invention will be described in more detail with reference to the following examples. These examples are provided only for illustration of the present invention and should not be construed as limiting the scope and spirit of the present invention.

EXAMPLE

Examples 1 to 4

Ingredients summarized in Table 1 below were added in the amounts disclosed as in the table and evenly mixed in a super mixer. The resultant mixture was melt kneaded at 200 to 290° C. using a twin-screw extruder, thereby obtaining a pellet.

The resultant pellet was used as a specimen for a property evaluation. In addition, a tube extrusion process (using a pelletizer) through blow or vacuum molding was performed such that a size of a real tube becomes 5 to 40ϕ, resulting in a pellet. The resultant pellet was used as a specimen for property evaluation.

Comparative Examples 1 to 4

A specimen was prepared in the same manner as in Example 1 except that ingredients summarized Table 1 below were used in the amounts disclosed in the table.

(A) Polypropylene Resin:

(A-1) A polypropylene resin having MI of 0.35, MI being measured for ten minutes under a load of 2.16 kg at 230° C. according to ASTM D1238.

(A-2) A polypropylene resin having MI of 10, MI being measured for ten minutes under a load of 2.16 kg at 230° C. according to ASTM D1238.

(B) Solid Phase Phosphate-based Flame Retardant:

(B-1) A coated phosphate-based solid phase flame retardant containing 16 to 20 wt % of phosphate measured with an ICP-OES (OPTIMA 7300DV available from PERKIN-ELMER) instrument after treating with sulfuric acid and nitric acid using the ICP-OES instrument and then diluting, and having a dynamic TGA peak of 250° C.

(B-2) A solid phase flame retardant having formula $[H2PO-O]_3Al^{3+}$, containing 30 to 32 wt % of phosphate measured using the ICP-OES instrument after treating sulfuric acid and nitric acid using the ICP-OES instrument and diluting, having a normal particle size distribution (D50) of 7 microns and a dynamic TGA peak of 275 to 300° C., and including PX-200 as a processing aid.

TABLE 1

| Classification | Examples | | | | Comparative Examples | | | |
|---|---|---|---|---|---|---|---|---|
| (wt %) | 1 | 2 | 3 | 4 | 1 | 2 | 3 | 4 |
| A-1 | 95 | 90 | 70 | 60 | 97 | 90 | 70 | 40 |
| A-2 | 0 | 0 | 20 | 20 | 0 | 0 | 0 | 20 |
| B-1 | 0 | 0 | 0 | 0 | 0 | 10 | 30 | 40 |
| B-2 | 5 | 10 | 10 | 20 | 3 | 0 | 0 | 0 |

Test Example

Characteristics of specimens manufactured from polypropylene flame retardant resin compositions prepared according to Examples 1 to 4 and Comparative Examples 1 to 4 were measured according to methods below. Results are summarized in Table 2 below.

[Property Measurement Test]

Frame retardancy: measured at a thickness of 1.6 mm according to a UL94 vertical manner.

Self-extinguishing property: a 300 mm tube specimen was hung at an angle of 45 degrees in the air and a lower portion of approximately 20 mm of the specimen was burned with an alcohol lamp or a gas burner. Flame was left and time taken until the flame was extinguished was measured. A pass standard was 15 seconds or less.

Extrusion workability of tube: evaluated with the naked eye according to UL 1581. For reference, "excellent" means an excellent appearance state without micro-dispersion residues of the flame retardants and die hole carbide, "good" means a state that may be successfully resolved by controlling foreign materials during a product production process since micro-dispersion residues of flame retardants are not generated and few residues are observed, "insufficient" means a state that flame retardancy and molding for extrusion tubing of a product are normally performed but continuous work is difficult during production of real products and, thus, flame retardant residues are generated and surface (appearance) quality is deteriorated, and "poor" means a state that flame retardancy is not exhibited, a surface thereof has lots of micro-dispersion flame retardant residues, and thus, molding and production are impossible.

Appearance of tube (gloss, roughness): measured with the naked eye and sensitive quality. For reference, angles and blades of edges must not be sharp (symmetry planes and lines) and unevenness of surfaces must be little to reduce diffused reflection and, thus, improve gloss.

For reference, symbols represented in tables mean standards described below:

⊚ Since load amounts of flame retardant, filler and other additives are extremely small, a tidy product almost like a base resin (raw material of virgin PP) may be obtained.

○ (State that reinforcement of flame retardant/filler is completely performed) partial non-molding regions in valley and crest portions of a corrugated tube are not observed, and boundary edges are perfectly formed. Accordingly, gloss is good and surfaces are smooth, thereby being suitable for mass production.

Δ Load amounts of a flame retardant and other additives increase and, thus, partial non-molding occurs. In addition, when a tube is observed with the naked eye, surface extrusion and roughness due to micro dispersion exist and gloss is deteriorated. Accordingly, mass production is difficult.

X Since flame retardant residues are periodically smeared due to continuous micro-dispersion and die drool of a flame retardant, extrusion workability is dramatically deteriorated. Workability was judged to be bad and mass production was judged to be impossible.

TABLE 2

| Classification | Examples | | | | Comparative Examples | | | |
| --- | --- | --- | --- | --- | --- | --- | --- | --- |
| | 1 | 2 | 3 | 4 | 1 | 2 | 3 | 4 |
| UL94(1.6 t) | V-2 | V-2 | V-2 | V-2 | Measurement is impossible | Measurement is impossible | V-0 | V-0 |
| Auto-ignition property of tube (0.3 t) | 9 seconds | 4 seconds | 4 seconds | 3 seconds | Exceeding 30 seconds (Measurement is impossible) | Exceeding 30 seconds (Measurement is impossible) | 10 seconds | 5 seconds |
| Extrusion workability | Excellent | Good | Good | Good | Excellent | Satisfactory | Poor | Poor |
| Appearance | ◎ | ◎ | ◎ | ○ | ◎ | ○ | X | X |

*Note:
standard of vehicle corrugated tube: [UL 94] V-2 @ 1.6 mm,
[Auto-ignition property] auto-ignition property of extrusion tubing molded product within 15 seconds @ 0.2 to 0.4 mm As shown in Table 2, in the cases of the extruded tube specimens prepared from the polyolefin-based flame retardant resin compositions according to the present invention (Examples 1 to 4), flame retardancy, auto ignition property, and particularly extrusion properties and appearance of the tubes were improved, when compared with Comparative Example 1 in which the polypropylene resin and the solid phase phosphate flame retardant were not used in proper amounts.

In addition, in the case of the extruded tube specimens prepared from the polyolefin-based flame retardant resin compositions according to the present invention (Examples 1 to 4), flame retardancy, and particularly auto ignition property, tube extrusion properties, and appearance of the tubes were improved, when compared with Comparative Example 2 in which an auto ignition property was not effectively exhibited due to dispersion of the solid phase flame retardant powder having a low amount of phosphate.

In addition, in the case of the extruded tube specimens prepared from the polyolefin-based flame retardant resin compositions according to the present invention (Examples 1 to 4), particularly extrusion workability and appearance were improved while maintaining an auto ignition property equivalent to Comparative Example 3 including the solid phase flame retardant powder in an amount of three times the amount of the solid phase flame retardant powder including a low amount of phosphate of Comparative Example 2.

Furthermore, in the case of the extruded tube specimens prepared from the polyolefin-based flame retardant resin compositions according to the present invention (Examples 1 to 4), particularly extrusion workability and appearance quality were improved while an auto ignition property equivalent to Comparative Example 4 in which two polypropylene resin types having a different melt index and the solid phase phosphate-based flame retardant having a low phosphate content were used.

Reference Example

To Example 1, polytetrafluoroethylene (not pre-treated) (C) as an anti dripping agent was added as summarized in a table below and the experiments the same as in Example 1 were repeated.

TABLE 3

| Classification | Reference Examples | |
| --- | --- | --- |
| (wt %) | 1 | 2 |
| A-1 | 64.5 | 58.8 |
| A-2 | 20 | 20 |

TABLE 3-continued

| Classification | Reference Examples | |
| --- | --- | --- |
| (wt %) | 1 | 2 |
| B-1 | 0 | 20 |
| B-2 | 15 | 0 |
| C | 0.5 | 0.2 |

With respect to Reference Examples 1 and 2, properties thereof were measured in the same manner as in Example 1. Results are summarized in Table 4 below.

TABLE 4

| Classification | Reference Examples | |
| --- | --- | --- |
| | 1 | 2 |
| UL94 (1.6 t) | Measurement impossible | V-1 |
| Auto-ignition property of tube (0.3 t) | Exceeding 30 seconds (measurement impossible) | Exceeding 30 seconds (measurement impossible) |
| Extrusion workability | Insufficient | Insufficient |
| Appearance quality | Δ | X |

As shown in Table 4, in the cases of Examples 1 to 4 described above, a dropping rate fast increased and, thus, an auto ignition property and the like were sufficiently improved. On the other hand, in the case of the extruded tube specimens prepared from the polyolefin-based flame retardant resin compositions to which a conventional anti dripping agent was separately added (Reference Examples 1 to 2), all of flame retardant, auto ignition property, extrusion workability, and appearance quality were poorer than those of Examples 1 to 4.

Therefore, the eco-friendly polyolefin-based flame retardant resin composition according to the present invention satisfies flame retardancy such as a UL94V V-2 grade and an auto ignition property of 15 seconds or less, improved extrusion properties, and appearance quality required in an extrusion tubing molded product and the like for insulation and wiring of electrical and electronic products and vehicles. It was confirmed that the polyolefin-based flame retardant resin composition comprising the polyolefin resin and the phosphate-based flame retardant accomplished the proposed flame retardancy, extrusion properties, and appearance quality, even while using a relatively small amount of particular phosphate-based flame retardant as a phosphate-based flame retardant, and a molded product manufactured from the composition may be provided.

Additional Examples 1 to 4

Ingredients summarized in Table 5 below were added to a super mix in the amounts disclosed in Table 5 and were uniformly mixed. The resultant mixtures were melt kneaded at 200 to 290° C. using a twin-screw extruder. Subsequently, a tube extrusion process (using a pelletizer) was performed through blow or vacuum molding such that a size thereof became 5 to 40ϕ, thereby obtaining a pellet. The resultant pellet was used as a specimen for property evaluation.

Additional Comparative Examples 1 to 4

A specimen was prepared in the same manner as in Example 1 except that ingredients disclosed in Table 5 were used in amounts disclosed in Table 5.

Materials below were additionally used:
Solid phase phosphate flame retardant (B):
A flame retardant in which a water absorption problem of a strand after coating and extruding (B-3) (FP2200 available from Adeka) was compensated.
Liquid-type phosphate ester (C): bisphenol A bis(diphenyl phosphate).
Surface-modified fluorine resin powder (D): fluorine resin powder modified with acryl.

TABLE 5

| Classification | Additional Examples | | | | Additional Comparative Examples | | | |
|---|---|---|---|---|---|---|---|---|
| | 1 | 2 | 3 | 4 | 1 | 2 | 3 | 4 |
| A-1 | 52.5 | 42 | 32 | 31 | 59.5 | 35 | 40 | 55 |
| A-2 | 25 | 25 | 25 | 25 | 25 | 25 | 25 | 25 |
| B-3 | 20 | 25 | 25 | 30 | 10 | 25 | 30 | 20 |
| C | 2 | 7 | 15 | 10 | 5 | 15 | — | — |
| D | 0.5 | 1 | 3 | 4 | 0.5 | — | 5 | — |

Test Example

Characteristics of the specimens prepared from the polypropylene flame retardant resin compositions prepared according to Additional Examples 1 to 4 and Additional Comparative Examples 1 to 4 were measured. Results are summarized in Table 6 below.

Additional experiments were additionally performed as follows:

[Property Measurement Test]

Extrusion processability of tube (appearance evaluation): evaluated with the naked eye according to UL 1581. For reference, ◎ means an excellent state (having excellent appearance without micro-dispersion residues of a flame retardant and die hole carbide), ○ means a good state (micro-dispersion residues of a flame retardant do not occur, few micro-dispersion residues are observed with the naked eye, and, thus, a product may be produced by controlling impurities), Δ means a state that continuous mass production of a real product is difficult and surface (appearance) quality due to generation of lots of flame retardant residues is deteriorated although flame retardancy and molding for extrusion tubing of a product are normal, and X means a state that flame retardancy is not accomplished, a surface has lots of micro-dispersion flame retardant residues, and, thus, molding and production are impossible.

Melt index (g/10 min, 230° C./2.16 kg): measured after filling a material at 230° C. according to ASTM D1238 and then staying for 4 minutes at a load of 2.16 kg.

Room-temperature tensile elongation ratio: sheets having a thickness of 1 mm according to UL 1581 were prepared and then left for 5 hours or more at room-temperature. Subsequently, five sheets having a dumbbell shape were taken and properties thereof were measured. In particular, each of the specimens was attached to a tensile tester and lines were drawn at an interval of 20 mm on a center portion of each specimen. Subsequently, the specimens were pulled at a constant rate of approximately 50 mm/min and, when fractured, a load and an elongation ratio were measured.

TABLE 6

| Classification | Additional Examples | | | | Additional Comparative Examples | | | |
|---|---|---|---|---|---|---|---|---|
| | 1 | 2 | 3 | 4 | 1 | 2 | 3 | 4 |
| UL94(1.6 t) | V-1 | V-0 | V-0 | V-0 | Measurement is impossible | V-1 | V-2 | V-2 |
| Auto-ignition property of tube(0.3 t) | 13 seconds | 5 seconds | 8 seconds | 3 seconds | Exceeding 30 seconds | 19 seconds | 27 seconds | Exceeding 30 seconds |
| Tube extrusion properties | ○ | ◎ | ◎ | ○ | Δ | X | X | X |
| Melt index (g/10 min) | 1.7 | 2.4 | 3.4 | 3.0 | 1.5 | 2.9 | 1.2 | 0.8 |
| Tensile elongation(%) | >300 | >200 | >250 | >200 | >300 | >100 | >200 | >250 |

As shown in Table 6, in the cases of the extruded tube specimens prepared from the polypropylene flame retardant resin compositions according to Additional Examples 1 to 4, flame retardancy, particularly auto ignition property and extrusion properties of a tube, and a melt index were improved, when compared with Additional Comparative Example 1 in which polypropylene and the phosphate flame retardant were used in an amount of less than a minimum load amount.

In addition, in the case of the extruded tube specimens prepared from the polypropylene flame retardant resin compositions according to Additional Examples 1 to 4, auto ignition property of a tube, tube extrusion properties, and tensile elongation were improved, when compared with Additional Comparative Example 2 in which lots of carbide (flame retardant residues) are generated during an extrusion process without use of a fluorine resin powder modified with acryl and, thus, continuous extrusion tubing work was difficult.

In addition, in the case of the extruded tube specimens prepared from the polypropylene flame retardant resin composition according to Additional Examples 1 to 4, flame retardancy, particularly an auto ignition property and extrusion properties of a tube, and a melt index were improved, when compared with Additional Comparative Example 3 in which a loading amount of the flame retardant was sufficient without use of liquid-type phosphate ester but flame retardancy was not exhibited due to micro dispersion of the solid phase phosphate flame retardant powder.

Furthermore, it was confirmed that, in the case of the extruded tube specimen prepared from the polypropylene flame retardant resin compositions according to Additional Examples 1 to 4, flame retardancy, particularly an auto ignition property and extrusion properties of a tube, and a melt index were improved, when compared with Additional Comparative Example 4 in which appearance quality was deteriorated due to flame retardant residues which smeared a surface of the specimen without use of all of the liquid-type phosphate ester and the surface-modified fluorine resin powder, an extrusion process and continuous work were difficult, and flame retardancy was not accomplished.

Therefore, it was confirmed that, with respect to an eco-friendly polypropylene flame retardant resin composition used in extruded tube products for insulation and wiring of electrical and electronic products and vehicles, eco-friendliness, flame retardancy, extrusion properties, and the like of an extruded tube product molded using the polypropylene flame retardant resin compositions according to the additional experiments of the present invention may be improved by improving flame retardancy and appearance quality through application of liquid-type phosphate ester while avoiding use of a large amount of conventionally added phosphate flame retardant, and optimizing fluidity and melt strength of the polymer suitable for tube extrusion molding due to addition of the surface-modified fluorine resin powder.

What is claimed is:

1. A polyolefin-based flame retardant resin composition comprising a polyolefin resin and a phosphate-based flame retardant, wherein the resin composition comprises 50 to 80 wt % of the polyolefin resin and 0.1 to 5 wt % of a surface-modified fluorine resin powder, wherein the surface-modified fluorine resin powder has a weight-average molecular weight of 100,000 g/mol or more and is prepared by extruding 0.1 to 90 wt % of surface-modified polytetrafluoroethylene having an average particle diameter of 10 µm or less and 10 to 99.9 wt % of a polypropylene resin having a viscosity of 500 to 1400 ml/g, and the phosphate-based flame retardant comprising 20 to 40 wt % of a solid phase phosphate flame retardant and 0.1 to 15 wt % of a liquid-type phosphate ester flame retardant, based on 100 wt % in total of ingredients constituting the composition.

2. The polyolefin-based flame retardant resin composition according to claim 1, wherein the solid phase phosphate flame retardant is one or more selected from triphenyl phosphate, diphenyl cresyl phosphate, ammonium polyphosphate, melamine polyphosphate, melamine pyrophosphate, melamine ammonium phosphate, piperazine pyrophosphate, piperazine phosphate, piperazine polyphosphate, piperazine pyrophosphate-phosphate-zinc oxide, 2-carboxyethyl phenyl phosphinic acid, 9,10-dihydro-9-oxa-10-phosphaphenanthrene-10-oxide, and 10-(2,5-dihydroxyphenyl)-9,10-dihydro-9-oxa-10-phosphaphenanthrene-10-oxide.

3. The polyolefin-based flame retardant resin composition according to claim 1, wherein the liquid-type phosphate ester is one or more selected from trimethyl phosphate, triethyl phosphate, triphenyl phosphate, tricresyl phosphate, trixylenyl phosphate, resorcinol bis(diphenyl phosphate), phenyl diresorcinol phosphate, bisphenol diphenyl phosphate, cresyl diphenyl phosphate, xylenyl diphenyl phosphate, phenyl di(isopropylphenyl)phosphate, triisophenyl phosphate, resorcinol diphosphate, and aromatic polyphosphate.

4. The polyolefin-based flame retardant resin composition according to claim 1, wherein the polyolefin resin has a melt index (MI) of 0.1 to 100 g/10 minutes as measured according to ASTM D1238, 230° C. and is an isotactic propylene homopolymer, an ethylene-propylene block or random copolymer, or a mixture thereof, having crystallizability.

5. The polyolefin-based flame retardant resin composition according to claim 1, wherein the surface-modified fluorine resin powder is polytetrafluoroethylene modified with alkyl (meth)acrylate.

6. The polyolefin-based flame retardant resin composition according to claim 5, wherein the alkyl (meth)acrylate comprises 10 to 90 wt % of alkyl methacrylate having a C1 to C30 alkyl group and 90 to 10 wt % of alkyl acrylate having a C1 to C30 alkyl group.

* * * * *